US009100880B2

(12) United States Patent  (10) Patent No.: US 9,100,880 B2
Chin et al.  (45) Date of Patent: Aug. 4, 2015

(54) METHODS AND SYSTEMS FOR QOS TRANSLATION DURING HANDOVER BETWEEN WIRELESS NETWORKS

(75) Inventors: Tom Chin, San Diego, CA (US); Guangming Carl Shi, San Diego, CA (US); Kuo-Chun Lee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 456 days.

(21) Appl. No.: 12/698,269

(22) Filed: Feb. 2, 2010

(65) Prior Publication Data

US 2010/0208607 A1    Aug. 19, 2010

Related U.S. Application Data

(60) Provisional application No. 61/152,635, filed on Feb. 13, 2009.

(51) Int. Cl.
*H04W 36/00* (2009.01)
*H04W 28/24* (2009.01)
*H04W 36/14* (2009.01)
*H04W 36/26* (2009.01)

(52) U.S. Cl.
CPC .......... *H04W 36/0044* (2013.01); *H04W 28/24* (2013.01); *H04W 36/14* (2013.01); *H04W 36/26* (2013.01)

(58) Field of Classification Search
CPC .. H04L 47/2491; H04W 36/08; H04W 36/30; H04W 24/00; H04W 36/18; H04W 36/0044; H04W 36/26; H04W 28/24; H04W 36/14
USPC ......... 370/241, 252, 310, 328, 329, 331, 332, 370/351, 389, 395.1, 395.2, 395.21; 455/403, 422.1, 436, 442
See application file for complete search history.

(56) References Cited

U.S. PATENT DOCUMENTS

| 8,331,375 B2 | 12/2012 | Babbar et al. |
| 2005/0227694 A1* | 10/2005 | Hayashi ..................... 455/436 |
| 2007/0025297 A1 | 2/2007 | Lee et al. |
| 2007/0028297 A1 | 2/2007 | Troyansky et al. |

(Continued)

FOREIGN PATENT DOCUMENTS

| CN | 101312586 A | 11/2008 |
| EP | 1583385 | 10/2005 |

(Continued)

OTHER PUBLICATIONS

International Search Report—PCT/US2010/024145—International Search Authority, European Patent Office, May 31, 2010.

(Continued)

*Primary Examiner* — Obaidul Huq
(74) *Attorney, Agent, or Firm* — Tyler J. Overall

(57) ABSTRACT

This disclosure provides methods and systems for translating quality of service (QoS) parameters of a first radio access technology (RAT), e.g., Worldwide Interoperability for Microwave Access (WiMAX), to QoS parameters of a second RAT, e.g., code division multiple access (CDMA) high rate packet data (HRPD). The methods and systems facilitate a handover by a multi-mode mobile station or other wireless device from the first RAT to the second RAT and vice versa.

24 Claims, 19 Drawing Sheets

(56) References Cited

U.S. PATENT DOCUMENTS

| | | | |
|---|---|---|---|
| 2007/0058545 A1* | 3/2007 | Nookala et al. | 370/230 |
| 2008/0186884 A1* | 8/2008 | Ahn et al. | 370/310 |
| 2008/0311909 A1* | 12/2008 | Taaghol et al. | 455/436 |
| 2009/0073933 A1* | 3/2009 | Madour et al. | 370/331 |

FOREIGN PATENT DOCUMENTS

| | | |
|---|---|---|
| JP | 2005525023 A | 8/2005 |
| JP | 2005286909 A | 10/2005 |
| JP | 2008511193 A | 4/2008 |
| JP | 2010530181 A | 9/2010 |
| WO | WO-03094447 A1 | 11/2003 |
| WO | WO-2006017839 A1 | 2/2006 |
| WO | WO 2008033615 | 3/2008 |
| WO | WO-2008157123 A1 | 12/2008 |

OTHER PUBLICATIONS

Taiwan Search Report—TW099104886—TIPO—Feb. 17, 2013.
Written Opinion—PCT/US2010/024145—ISA/EPO—May 31, 2010.
3rd Generation Partnership Project 2 "3GPP2", cdma2000 Wireless IP Network Standard: Quality of Service and Header Reduction, 3GPP2 X.S0011-004-D, v2.0, Nov. 2008. pp. 1-68.

* cited by examiner

| Type of Data Delivery | UGS | ERT-VR | RT-VR | NRT-VR | BE |
|---|---|---|---|---|---|
| Maximum Sustained Traffic Rate | | X | X | X | X |
| Minimum Reserved Traffic Rate | X | X | X | X | |
| Maximum Latency | X | X | X | | |
| Maximum Traffic Burst | | X | X | X | X |
| Tolerated Jitter | X | | | | |
| Traffic Priority | | X | X | X | |
| Unsolicited Grant Interval | X | | | | |
| Unsolicited Polling Interval | | X | X | | |
| Packet Error Rate | | | | | |
| SDU Size (if fixed SDU size) | | | | | |

FIG. 6

| | CDMA HRPD | | WiMAX | | | | |
|---|---|---|---|---|---|---|---|
| Flow Profile ID | Description | Type of Data Delivery | Max Sustained Traffic Rate (MSTR) | Min Reserved Traffic Rate (mRTR) | Max Latency (ML) | Packet Rate Error | Polling Interval |
| 0 | Best effort | BE | R1 | | | | |
| 1 | Streaming 32 kbps | RT-VBR | c1*mRTR | 32 kbps | L | | c2*ML |
| 2 | Streaming 64 kbps | RT-VBR | c1*mRTR | 64 kbps | L | | c2*ML |
| 3 | Streaming 96 kbps | RT-VBR | c1*mRTR | 96 kbps | L | | c2*ML |
| 4 | Streaming 128 kbps | RT-VBR | c1*mRTR | 128 kpbs | L | | c2*ML |
| 5 | Minimum Acceptable User Data Rate of 32kbps, max. latency is 100msec, 1% avg. data loss rate | RT-VBR | c1*mRTR | 32 kbps | 100ms | 1% | c2*ML |
| 6 | Minimum Acceptable User Data Rate of 64kbps, max. latency is 100msec, 1% avg. data loss rate | RT-VBR | c1*mRTR | 64 kbps | 100ms | 1% | c2*ML |
| 7 | Minimum Acceptable User Data Rate of 96kbps, max. latency is 100msec, 1% avg. data loss rate | RT-VBR | c1*mRTR | 96 kbps | 100ms | 1% | c2*ML |
| 8 | Minimum Acceptable User Data Rate of 144kbps, max. latency is 100msec, 1% avg. data loss rate | RT-VBR | c1*mRTR | 144 kbps | 100ms | 1% | c2*ML |
| 9 | Minimum Acceptable User Data Rate of 384kbps, max. latency is 100msec, 1% avg. data loss rate | RT-VBR | c1*mRTR | 384 kbps | 100ms | 1% | c2*ML |
| 10 | Minimum Acceptable User Data Rate of 768kbps, max. latency is 100msec, 1% avg. data loss rate | RT-VBR | c1*mRTR | 768 kbps | 100ms | 1% | c2*ML |

FIG. 7A

| | CDMA HRPD | | WiMAX | | | | |
|---|---|---|---|---|---|---|---|
| Flow Profile ID | Description | Type of Data Delivery | Max Sustained Traffic Rate (MSTR) | Min Reserved Traffic Rate (mRTR) | Max Latency (ML) | Packet Rate Error | Polling Interval |
| 11 | Minimum Acceptable User Data Rate of 1536kbps, max. latency is 100msec, 1% avg. data loss rate | RT-VBR | $c1*mRTR$ | 1536 kbps | 100ms | 1% | $c2*ML$ |
| 12 | Minimum Acceptable User Data Rate of 32kbps, max. latency is 100msec, 0.1% avg. data loss rate | RT-VBR | $c1*mRTR$ | 32 kbps | 100ms | 0.1% | $c2*ML$ |
| 13 | Minimum Acceptable User Data Rate of 64kbps, max. latency is 100msec, 0.1% avg. data loss rate | RT-VBR | $c1*mRTR$ | 64 kbps | 100ms | 0.1% | $c2*ML$ |
| 14 | Minimum Acceptable User Data Rate of 96kbps, max. latency is 100msec, 0.1% avg. data loss rate | RT-VBR | $c1*mRTR$ | 96 kbps | 100ms | 0.1% | $c2*ML$ |
| 15 | Minimum Acceptable User Data Rate of 144kbps, max. latency is 100msec, 0.1% avg. data loss rate | RT-VBR | $c1*mRTR$ | 144 kbps | 100ms | 0.1% | $c2*ML$ |
| 16 | Minimum Acceptable User Data Rate of 384kbps, max. latency is 100msec, 0.1% avg. data loss rate | RT-VBR | $c1*mRTR$ | 384 kbps | 100ms | 0.1% | $c2*ML$ |
| 17 | Minimum Acceptable User Data Rate of 32kbps, max. latency is 100msec, 0.0001% avg. data loss rate | RT-VBR | $c1*mRTR$ | 32 kbps | 100ms | 0.0001% | $c2*ML$ |
| 18 | Minimum Acceptable User Data Rate of 64kbps, max. latency is 100msec, 0.0001% avg. data loss rate | RT-VBR | $c1*mRTR$ | 64 kbps | 100ms | 0.0001% | $c2*ML$ |
| 19 | Minimum Acceptable User Data Rate of 96kbps, max. latency is 100msec, 0.0001% avg. data loss rate | RT-VBR | $c1*mRTR$ | 96 kbps | 100ms | 0.0001% | $c2*ML$ |
| 20 | Minimum Acceptable User Data Rate of 144kbps, max. latency is 100msec, 0.0001% avg. data loss rate | RT-VBR | $c1*mRTR$ | 144 kbps | 100ms | 0.0001% | $c2*ML$ |

FIG. 7B

| | CDMA HRPD | WiMAX | | | | | |
|---|---|---|---|---|---|---|---|
| Flow Profile ID | Description | Type of Data Delivery | Max Sustained Traffic Rate (MSTR) | Min Reserved Traffic Rate (mRTR) | Max Latency (ML) | Packet Rate Error | Polling Interval |
| 21 | Minimum Acceptable User Data Rate of 32kbps, max. latency is 500msec, 1% avg. data loss rate | NRT-VBR | c1*mRTR | 32 kbps | | 1% | |
| 22 | Minimum Acceptable User Data Rate of 64kbps, max. latency is 500msec, 1% avg. data loss rate | NRT-VBR | c1*mRTR | 64 kbps | | 1% | |
| 23 | Minimum Acceptable User Data Rate of 96kbps, max. latency is 500msec, 1% avg. data loss rate | NRT-VBR | c1*mRTR | 96 kbps | | 1% | |
| 24 | Minimum Acceptable User Data Rate of 144kbps, max. latency is 500msec, 1% avg. data loss rate | NRT-VBR | c1*mRTR | 144 kbps | | 1% | |
| 25 | Minimum Acceptable User Data Rate of 384kbps, max. latency is 500msec, 1% avg. data loss rate | NRT-VBR | c1*mRTR | 384 kbps | | 1% | |
| 26 | Minimum Acceptable User Data Rate of 768kbps, max. latency is 500msec, 1% avg. data loss rate | NRT-VBR | c1*mRTR | 768 kbps | | 1% | |
| 27 | Minimum Acceptable User Data Rate of 1536kbps, max. latency is 500msec, 1% avg. data loss rate | NRT-VBR | c1*mRTR | 1536 kbps | | 1% | |
| 28 | Minimum Acceptable User Data Rate of 32kbps, max. latency is 500msec, 0.1% avg. data loss rate | NRT-VBR | c1*mRTR | 32 kbps | | 0.1% | |
| 29 | Minimum Acceptable User Data Rate of 64kbps, max. latency is 500msec, 0.1% avg. data loss rate. | NRT-VBR | c1*mRTR | 64 kbps | | 0.1% | |
| 30 | Minimum Acceptable User Data Rate of 96kbps, max. latency is 500msec, 0.1% avg. data loss rate | NRT-VBR | c1*mRTR | 96 kbps | | 0.1% | |

FIG. 7C

| | CDMA HRPD | WiMAX | | | | | |
|---|---|---|---|---|---|---|---|
| Flow Profile ID | Description | Type of Data Delivery | Max Sustained Traffic Rate (MSTR) | Min Reserved Traffic Rate (mRTR) | Max Latency (ML) | Packet Rate Error | Polling Interval |
| 31 | Minimum Acceptable User Data Rate of 144kbps, max. latency is 500msec, 0.1% avg. data loss rate | NRT-VBR | c1*mRTR | 144 kbps | | 0.1% | |
| 32 | Minimum Acceptable User Data Rate of 384kbps, max. latency is 500msec, 0.1% avg. data loss rate | NRT-VBR | c1*mRTR | 384 kbps | | 0.1% | |
| 33 | Minimum Acceptable User Data Rate of 768kbps, max. latency is 500msec, 0.1% avg. data loss rate | NRT-VBR | c1*mRTR | 768 kbps | | 0.1% | |
| 34 | Minimum Acceptable User Data Rate of 1536kbps, max. latency is 500msec, 0.1% avg. data loss rate | NRT-VBR | c1*mRTR | 1536 kbps | | 0.1% | |
| 35 | Minimum Acceptable User Data Rate of 32kbps, max. latency is 500msec, 0.0001% avg. data loss rate | NRT-VBR | c1*mRTR | 32 kbps | | 0.0001% | |
| 36 | Minimum Acceptable User Data Rate of 64kbps, max. latency is 500msec, 0.0001% avg. data loss rate | NRT-VBR | c1*mRTR | 64 kbps | | 0.0001% | |
| 37 | Minimum Acceptable User Data Rate of 96kbps, max. latency is 500msec, 0.0001% avg. data loss rate | NRT-VBR | c1*mRTR | 96 kbps | | 0.0001% | |
| 38 | Minimum Acceptable User Data Rate of 144kbps, max. latency is 500msec, 0.0001% avg. data loss rate | NRT-VBR | c1*mRTR | 144 kbps | | 0.0001% | |
| 39 | Minimum Acceptable User Data Rate of 384kbps, max. latency is 500msec, 0.0001% avg. data loss rate | NRT-VBR | c1*mRTR | 384 kbps | | 0.0001% | |
| 40 | Minimum Acceptable User Data Rate of 32kbps, max. latency is 2000msec, 1% avg. data loss rate | NRT-VBR | c1*mRTR | 32 kbps | | 1% | |

FIG. 7D

| Flow Profile ID | Description | Type of Data Delivery | Max Sustained Traffic Rate (MSTR) | Min Reserved Traffic Rate (mRTR) | Max Latency (ML) | Packet Rate Error | Polling Interval |
|---|---|---|---|---|---|---|---|
| 41 | Minimum Acceptable User Data Rate of 64kbps, max. latency is 2000msec, 1% avg. data loss rate | NRT-VBR | c1*mRTR | 64 kbps | | 1% | |
| 42 | Minimum Acceptable User Data Rate of 96kbps, max. latency is 2000msec, 1% avg. data loss rate | NRT-VBR | c1*mRTR | 96 kbps | | 1% | |
| 43 | Minimum Acceptable User Data Rate of 144kbps, max. latency is 2000msec, 1% avg. data loss rate | NRT-VBR | c1*mRTR | 144 kbps | | 1% | |
| 44 | Minimum Acceptable User Data Rate of 384kbps, max. latency is 2000msec, 1% avg. data loss rate | NRT-VBR | c1*mRTR | 384 kbps | | 1% | |
| 45 | Minimum Acceptable User Data Rate of 768kbps, max. latency is 2000msec, 1% avg. data loss rate | NRT-VBR | c1*mRTR | 768 kbps | | 1% | |
| 46 | Minimum Acceptable User Data Rate of 1536kbps, max. latency is 2000msec, 1% avg. data loss rate | NRT-VBR | c1*mRTR | 1536 kbps | | 1% | |
| 47 | Minimum Acceptable User Data Rate of 32kbps, max. latency is 2000msec, 0.1% avg. data loss rate | NRT-VBR | c1*mRTR | 32 kbps | | 0.1% | |
| 48 | Minimum Acceptable User Data Rate of 64kbps, max. latency is 2000msec, 0.1% avg. data loss rate | NRT-VBR | c1*mRTR | 64 kbps | | 0.1% | |
| 49 | Minimum Acceptable User Data Rate of 96kbps, max. latency is 2000msec, 0.1% avg. data loss rate | NRT-VBR | c1*mRTR | 96 kbps | | 0.1% | |
| 50 | Minimum Acceptable User Data Rate of 144kbps, max. latency is 2000msec, 0.1% avg. data loss rate | NRT-VBR | c1*mRTR | 144 kbps | | 0.1% | |

CDMA HRPD / WiMAX

FIG. 7E

| | CDMA HRPD | | | WiMAX | | | |
|---|---|---|---|---|---|---|---|
| Flow Profile ID | Description | Type of Data Delivery | Max Sustained Traffic Rate (MSTR) | Min Reserved Traffic Rate (mRTR) | Max Latency (ML) | Packet Rate Error | Polling Interval |
| 51 | Minimum Acceptable User Data Rate of 384kbps, max. latency is 2000msec, 0.1% avg. data loss rate | NRT-VBR | c1*mRTR | 384 kbps | | 0.1% | |
| 52 | Minimum Acceptable User Data Rate of 768kbps, max. latency is 2000msec, 0.1% avg. data loss rate | NRT-VBR | c1*mRTR | 768 kbps | | 0.1% | |
| 53 | Minimum Acceptable User Data Rate of 1536kbps, max. latency is 2000msec, 0.1% avg. data loss rate | NRT-VBR | c1*mRTR | 1536 kbps | | 0.1% | |
| 54 | Minimum Acceptable User Data Rate of 32kbps, max. latency is 2000msec, 0.0001% avg. data loss rate | NRT-VBR | c1*mRTR | 32 kbps | | 0.0001% | |
| 55 | Minimum Acceptable User Data Rate of 64kbps, max. latency is 2000msec, 0.0001% avg. data loss rate | NRT-VBR | c1*mRTR | 64 kbps | | 0.0001% | |
| 56 | Minimum Acceptable User Data Rate of 96kbps, max. latency is 2000msec, 0.0001% avg. data loss rate | NRT-VBR | c1*mRTR | 96 kbps | | 0.0001% | |
| 57 | Minimum Acceptable User Data Rate of 144kbps, max. latency is 2000msec, 0.0001% avg. data loss rate | NRT-VBR | c1*mRTR | 144 kbps | | 0.0001% | |
| 58 | Minimum Acceptable User Data Rate of 384kbps, max. latency is 2000msec, 0.0001% avg. data loss rate | NRT-VBR | c1*mRTR | 384 kbps | | 0.0001% | |
| 59 | Minimum Acceptable User Data Rate of 768kbps, max. latency is 2000msec, 0.0001% avg. data loss rate | NRT-VBR | c1*mRTR | 768 kbps | | 0.0001% | |
| 60 | Minimum Acceptable User Data Rate of 1536kbps, max. latency is 2000msec, 0.0001% avg. data loss rate | NRT-VBR | c1*mRTR | 1536 kbps | | 0.0001% | |

FIG. 7F

| | | WiMAX | | | | | | |
|---|---|---|---|---|---|---|---|---|
| CDMA HRPD | | | | | | | | |
| Flow Profile ID | Description | Type of Data Delivery | Max Sustained Traffic Rate (MSTR) | Min Reserved Traffic Rate (mRTR) | Max Latency (ML) | Packet Rate Error | Polling Interval | Grant Interval |
| 256 | Conversational Rate Set 1 Interactive Speech, full rate with No Frame Bundling | UGS | | 9.6 kbps | L1 | E1 | | 20ms |
| 257 | Conversational Rate Set 2 Interactive Speech, full rate with No Frame Bundling | UGS | | 14.4 kbps | L1 | E1 | | 20ms |
| 258 | Streaming Rate Set 1 Interactive Speech, full rate with No Frame Bundling | RT-VR | mRTR | 9.6 kbps | L2 | E1 | c2*ML | |
| 259 | Streaming Rate Set 2 Interactive Speech, full rate with No Frame Bundling | RT-VR | mRTR | 14.4 kbps | L2 | E1 | c2*ML | |
| 260 | Streaming Rate Set 2 Interactive Speech, half rate max with No Frame Bundling | RT-VR | mRTR | 14.4 kbps | L2 | E1 | c2*ML | |
| 261 | Conversational Rate Set 1 PtT Speech, full rate with No Frame Bundling | UGS | | 9.6 kbps | L1 | E1 | | 20ms |
| 262 | Conversational Rate Set 2 PtT Speech, full rate with No Frame Bundling | UGS | | 14.4 kbps | L1 | E1 | | 20ms |
| 263 | Streaming Rate Set 1 PtT Speech, full rate with No Frame Bundling | RT-VR | mRTR | 9.6 kbps | L2 | E1 | c2*ML | |
| 264 | Streaming Rate Set 2 PtT Speech, full rate with No Frame Bundling | RT-VR | mRTR | 14.4 kbps | L2 | E1 | c2*ML | |
| 265 | Streaming Rate Set 2 PtT Speech, half rate max with No Frame Bundling | RT-VR | 5 * mRTR | 14.4 kbps *1/2 | L2 | E1 | c2*ML | |

FIG. 8A

| Flow Profile ID | Description | Type of Data Delivery | Max Sustained Traffic Rate (MSTR) | Min Reserved Traffic Rate (mRTR) | Max Latency (ML) | Packet Rate Error | Polling Interval | Grant Interval |
|---|---|---|---|---|---|---|---|---|
| | | CDMA HRPD | | | WiMAX | | | |
| 266 | Conversational Rate Set 1 PtT Speech with Frame Bundling, Maximum of 5 full rate Frames Bundled | ERT-VR | 5 * mRTR | 9.6 kbps | L1 | E1 | c2*ML | |
| 267 | Conversational Rate Set 2 PtT Speech with Frame Bundling, Maximum of 5 full rate Frames Bundled | ERT-VR | 5 * mRTR | 14.4 kbps | L1 | E1 | c2*ML | |
| 268 | Streaming Rate Set 1 PtT Speech, full rate with Frame Bundling, Maximum of 5 Frames Bundled | RT-VR | 5 * mRTR | 9.6 kbps | L2 | E1 | c2*ML | |
| 269 | Streaming Rate Set 2 PtT Speech, full rate with Frame Bundling, Maximum of 5 Frames Bundled | RT-VR | 5 * mRTR | 14.4 kbps | L2 | E1 | c2*ML | |
| 270 | Streaming Rate Set 2 PtT Speech, half rate max with Frame Bundling, Maximum of 5 Frames Bundled | RT-VR | 5 * mRTR | 14.4 kbps * 1/2 | L2 | E1 | c2*ML | |
| 271 | Conversational Rate Set 1 PtT Speech, full rate with Frame Bundling, Maximum of 6 Frames Bundled | ERT-VR | 6 * mRTR | 9.6 kbps | L1 | E1 | c2*ML | |
| 272 | Conversational Rate Set 2 PtT Speech, full rate with Frame Bundling, Maximum of 6 Frames Bundled | ERT-VR | 6 * mRTR | 14.4 kbps | L1 | E1 | c2*ML | |
| 273 | Streaming Rate Set 1 PtT Speech, full rate with Frame Bundling, Maximum of 6 Frames Bundled | RT-VR | 6 * mRTR | 9.6 kbps | L2 | E1 | c2*ML | |
| 274 | Streaming Rate Set 2 PtT Speech, full rate with Frame Bundling, Maximum of 6 Frames Bundled | RT-VR | 6 * mRTR | 14.4 kbps | L2 | E1 | c2*ML | |
| 275 | Streaming Rate Set 2 PtT Speech, half rate max with Frame Bundling, Maximum of 6 Frames Bundled | RT-VR | 6 * mRTR | 14.4 kbps | L2 | E1 | c2*ML | |

FIG. 8B

| Flow Profile ID | Description | CDMA HRPD | | | | | WiMAX | |
|---|---|---|---|---|---|---|---|---|
| | | Type of Data Delivery | Max Sustained Traffic Rate (MSTR) | Min Reserved Traffic Rate (mRTR) | Max Latency (ML) | Packet Rate Error | Polling Interval | Grant Interval |
| 276 | Conversational Rate Set 1 PtT Speech, full rate with frame bundling, Maximum of 4 Frames Bundled | ERT-VR | 4 * mRTR | 9.6 kbps | L1 | E1 | c2*ML | |
| 277 | Conversational Rate Set 1 PtT Speech, half rate max with no frame bundling | ERT-VR | mRTR | 9.6 kbps * 1/2 | L1 | E1 | c2*ML | |
| 278 | Conversational Rate Set 1 PtT Speech, half rate max with frame bundling, maximum of 4 frames bundled | ERT-VR | 4 * mRTR | 9.6 kbps * 1/2 | L1 | E1 | c2*ML | |
| 279 | Conversational Rate Set 1 PtT Speech, half rate max with frame bundling, maximum of 5 frames bundled | ERT-VR | 5 * mRTR | 9.6 kbps * 1/2 | L1 | E1 | c2*ML | |
| 280 | Conversational Rate Set 1 PtT Speech, half rate max with frame bundling, maximum of 6 frames bundled | ERT-VR | 6 * mRTR | 9.6 kbps * 1/2 | L1 | E1 | c2*ML | |
| 281 | Streaming Rate Set 1 PtT Speech, full rate with frame bundling, maximum of 4 frames bundled | RT-VR | 4 * mRTR | 9.6 kbps | L2 | E1 | c2*ML | |
| 282 | Streaming Rate Set 1 PtT Speech, half rate max with no frame bundling | RT-VR | mRTR | 9.6 kbps * 1/2 | L2 | E1 | c2*ML | |
| 283 | Streaming Rate Set 1 PtT Speech, half rate max with frame bundling, maximum of 4 frames bundled | RT-VR | 4 * mRTR | 9.6 kbps * 1/2 | L2 | E1 | c2*ML | |
| 284 | Streaming Rate Set 1 PtT Speech, half rate max with frame bundling, maximum of 5 frames bundled | RT-VR | 5 * mRTR | 9.6 kbps * 1/2 | L2 | E1 | c2*ML | |
| 285 | Streaming Rate Set 1 PtT Speech, half rate max with frame bundling, maximum of 6 frames bundled | RT-VR | 6 * mRTR | 9.6 kbps * 1/2 | L2 | E1 | c2*ML | |

FIG. 8C

| Flow Profile ID | CDMA HRPD | WiMAX | | | | | |
|---|---|---|---|---|---|---|---|
| | Description | Type of Data Delivery | Max Sustained Traffic Rate (MSTR) | Min Reserved Traffic Rate (mRTR) | Max Latency (ML) | Packet Rate Error | Polling Interval | Grant Interval |
| 286 | Conversational RS1, Interactive speech, No frame bundling, active speech (Non-DTX) average bit rate 5.8 kbps, peak bit rate 8.55 kbps | ERT-VR | 8.55 kbps | 5.8 kbps | L1 | E1 | c2*ML | |
| 287 | Conversational RS1, Interactive speech, No frame bundling, active speech (Non-DTX) average bit rate 5.11 kbps, peak bit rate 8.55 kbps | ERT-VR | 8.55 kbps | 5.11 kbps | L1 | E1 | c2*ML | |
| 288 | Conversational RS1, Interactive speech, No frame bundling, active speech (Non-DTX) average bit rate 3 kbps, peak bit rate 4 kbps | ERT-VR | 4 kbps | 3 kbps | L1 | E1 | c2*ML | |
| 289 | Conversational RS1, PtT speech, No frame bundling, active speech (Non-DTX) average bit rate 5.8 kbps, peak bit rate 8.55 kbps | ERT-VR | 8.55 kbps | 5.8 kbps | L1 | E1 | c2*ML | |
| 290 | Conversational RS1, PtT speech, No frame bundling, active speech (Non-DTX) average bit rate 5.11 kbps, peak bit rate 8.55 kbps | ERT-VR | 8.55 kbps | 5.11 kbps | L1 | E1 | c2*ML | |
| 291 | Conversational RS1, PtT speech, No frame bundling, active speech (Non-DTX) average bit rate 3 kbps, peak bit rate 4 kbps | ERT-VR | 4 kbps | 3 kbps | L2 | E1 | c2*ML | |

FIG. 8D

| | CDMA HRPD | | WiMAX | | | | | |
|---|---|---|---|---|---|---|---|---|
| Flow Profile ID | Description | | Type of Data Delivery | Max Sustained Traffic Rate (MSTR) | Min Reserved Traffic Rate (mRTR) | Max Latency (ML) | Packet Rate Error | Polling Interval |
| 512 | Streaming Audio 16k | | RT-VBR | c3*mRTR | 16 kbps | L3 | E2 | c2*ML |
| 513 | Streaming Audio 24k | | RT-VBR | c3*mRTR | 24 kbps | L3 | E2 | c2*ML |
| 514 | Streaming Audio 32k | | RT-VBR | c3*mRTR | 32 kbps | L3 | E2 | c2*ML |
| 515 | Streaming Audio 48k | | RT-VBR | c3*mRTR | 48 kbps | L3 | E2 | c2*ML |
| 516 | Streaming Audio 64k | | RT-VBR | c3*mRTR | 64 kpbs | L3 | E2 | c2*ML |

FIG. 9

| | | CDMA HRPD | | WiMAX | | | | |
|---|---|---|---|---|---|---|---|---|
| Flow Profile ID | Description | Type of Data Delivery | Max Sustained Traffic Rate (MSTR) | Min Reserved Traffic Rate (mRTR) | Max Latency (ML) | Packet Rate Error | Polling Interval |
| 768 | Conversational Interactive Video 24k | ERT-VBR | c4*mRTR | 24 kbps | L4 | E3 | c2*ML |
| 769 | Conversational Interactive Video 32k | ERT-VBR | c4*mRTR | 32 kbps | L4 | E3 | c2*ML |
| 770 | Conversational Interactive Video 40k | ERT-VBR | c4*mRTR | 40 kbps | L4 | E3 | c2*ML |
| 771 | Conversational Interactive Video 48k | ERT-VBR | c4*mRTR | 48 kbps | L4 | E3 | c2*ML |
| 772 | Conversational Interactive Video 56k | ERT-VBR | c4*mRTR | 56 kbps | L4 | E3 | c2*ML |
| 773 | Conversational Interactive Video 64k | ERT-VBR | c4*mRTR | 64 kbps | L4 | E3 | c2*ML |
| 774 | Conversational PtT Video 24k | ERT-VBR | c4*mRTR | 24 kbps | L4 | E3 | c2*ML |
| 775 | Conversational PtT Video 32k | ERT-VBR | c4*mRTR | 32 kbps | L4 | E3 | c2*ML |
| 776 | Conversational PtT Video 40k | ERT-VBR | c4*mRTR | 40 kbps | L4 | E3 | c2*ML |
| 777 | Conversational PtT Video 48k | ERT-VBR | c4*mRTR | 48 kbps | L4 | E3 | c2*ML |
| 778 | Conversational PtT Video 56k | ERT-VBR | c4*mRTR | 56 kbps | L4 | E3 | c2*ML |
| 779 | Conversational PtT Video 64k | ERT-VBR | c4*mRTR | 64 kbps | L4 | E3 | c2*ML |
| 780 | Streaming Video 24k | RT-VBR | c4*mRTR | 24 kbps | L4 | E3 | c2*ML |
| 781 | Streaming Video 48k | RT-VBR | c4*mRTR | 48 kbps | L4 | E3 | c2*ML |
| 782 | Streaming Video 64k | RT-VBR | c4*mRTR | 64 kbps | L4 | E3 | c2*ML |
| 783 | Streaming Video 96k | RT-VBR | c4*mRTR | 96 kbps | L4 | E3 | c2*ML |
| 784 | Streaming Video 120k | RT-VBR | c4*mRTR | 120 kbps | L4 | E3 | c2*ML |
| 785 | Streaming Video 128k | RT-VBR | c4*mRTR | 128 kpbs | L4 | E3 | c2*ML |

FIG. 10

CDMA HRPD / WiMAX

| Flow Profile ID | Description | Type of Data Delivery | Max Sustained Traffic Rate (MSTR) | Min Reserved Traffic Rate (mRTR) | Max Latency (ML) | Packet Rate Error | Polling Interval |
|---|---|---|---|---|---|---|---|
| 1024 | Streaming Text (3GPP) | RT-VBR | c5*mRTR | R3 | L8 | E4 | c2*ML |

FIG. 11

CDMA HRPD / WiMAX

| Flow Profile ID | Description | Type of Data Delivery | Max Sustained Traffic Rate (MSTR) | Min Reserved Traffic Rate (mRTR) | Max Latency (ML) | Packet Rate Error | Polling Interval |
|---|---|---|---|---|---|---|---|
| 1280 | Conversational Media Control Signaling | ERT-VBR | c6*mRTR | R2 | L6 | E5 | c2*ML |
| 1281 | Streaming Media Control Signaling | ERT-VBR | c6*mRTR | R2 | L6 | E5 | c2*ML |
| 1282 | Interactive Media Control Signaling | ERT-VBR | c6*mRTR | R2 | L6 | E5 | c2*ML |
| 1283 | Push-To-Talk Media Control Signaling | ERT-VBR | c6*mRTR | R2 | L6 | E5 | c2*ML |

FIG. 12

CDMA HRPD / WiMAX

| Flow Profile ID | Description | Type of Data Delivery | Max Sustained Traffic Rate (MSTR) | Min Reserved Traffic Rate (mRTR) | Max Latency (ML) | Packet Rate Error | Polling Interval |
|---|---|---|---|---|---|---|---|
| 1536 | Interactive Gaming | ERT-VBR | c7*mRTR | R3 | L7 | E6 | c2*ML |

FIG. 13

METHODS AND SYSTEMS FOR QOS TRANSLATION DURING HANDOVER BETWEEN WIRELESS NETWORKS

CLAIM OF PRIORITY

This application claims the benefit of priority from U.S. Provisional Patent Application Ser. No. 61/152,635, entitled "Method and System for QOS Translation during Handover between WiMAX and HRPD Networks" and filed Feb. 13, 2009, which is assigned to the assignee of this application and is fully incorporated herein by reference for all purposes.

TECHNICAL FIELD

Certain embodiments of the present disclosure generally relate to wireless communications, and more particularly to methods and systems for translation of quality of service parameters between two radio access technologies.

SUMMARY

Certain embodiments provide a method for a wireless communications. The method generally includes determining quality of service (QoS) parameters of a first radio access technology (RAT), translating the QoS parameters of the first RAT to the QoS parameters of a second RAT, and performing a handover from a network utilizing the first RAT to another network utilizing the second RAT using the translated QoS parameters.

Certain embodiments provide an apparatus for a wireless communications. The apparatus generally includes means for determining quality of service (QoS) parameters of a first radio access technology (RAT), means for translating the QoS parameters of the first RAT to the QoS parameters of a second RAT, and means for performing a handover from a network utilizing the first RAT to another network utilizing the second RAT using the translated QoS parameters.

Certain embodiments provide an apparatus for a wireless communications. The apparatus generally includes logic for determining quality of service (QoS) parameters of a first radio access technology (RAT), logic for translating the QoS parameters of the first RAT to the QoS parameters of a second RAT, and logic for performing a handover from a network utilizing the first RAT to another network utilizing the second RAT using the translated QoS parameters.

Certain embodiments of the present disclosure provide a computer-program product for wireless communications, comprising a computer readable medium having instructions stored thereon, the instructions being executable by one or more processors. The instructions generally include instructions for determining quality of service (QoS) parameters of a first radio access technology (RAT), instructions for translating the QoS parameters of the first RAT to the QoS parameters of a second RAT, and instructions for performing a handover from a network utilizing the first RAT to another network utilizing the second RAT using the translated QoS parameters.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 6 illustrates a table consisting of example QoS parameters for WiMAX standard for different types of delivery.

FIGS. 7A-7F illustrate an example translation of the QoS parameters of the CDMA HRPD generic data service to the QoS parameters of the WiMAX standard, in accordance with certain embodiments of the present disclosure.

FIGS. 8A-8D illustrate an example translation of the QoS parameters of the CDMA HRPD speech service to the QoS parameters of the WiMAX standard, in accordance with certain embodiments of the present disclosure.

FIG. 9 illustrates an example translation of the QoS parameters of the CDMA HRPD audio service to the QoS parameters of the WiMAX standard, in accordance with certain embodiments of the present disclosure.

FIG. 10 illustrates an example translation of the QoS parameters of the CDMA HRPD video service to the QoS parameters of the WiMAX standard, in accordance with certain embodiments of the present disclosure.

FIG. 11 illustrates an example translation of the QoS parameters of the CDMA HRPD text service to the QoS parameters of the WiMAX standard, in accordance with certain embodiments of the present disclosure.

FIG. 12 illustrates an example translation of the QoS parameters of the CDMA HRPD signaling service to the QoS parameters of the WiMAX standard, in accordance with certain embodiments of the present disclosure.

FIG. 13 illustrates an example translation of the QoS parameters of the CDMA HRPD gaming service to the QoS parameters of the WiMAX standard, in accordance with certain embodiments of the present disclosure.

DETAILED DESCRIPTION

Figure 1:
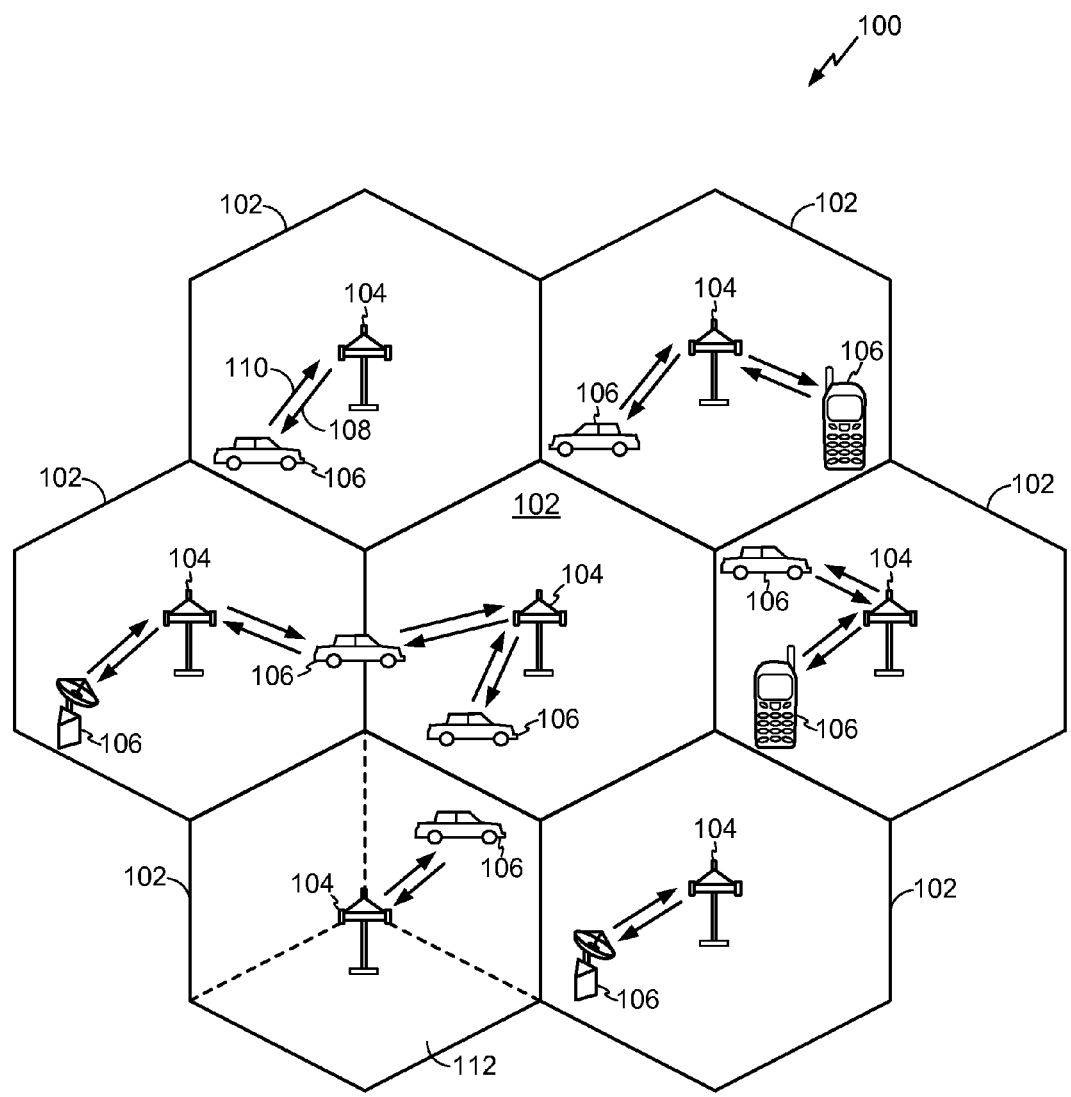
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

A multi-mode mobile station (MS) may handover from a network supported by a first radio access technology (RAT), such as Worldwide Interoperability for Microwave Access (WiMAX), to a network supported by a second RAT, such as code division multiple access (CDMA) HRPD (High Rate Packet Data) network. One example scenario may be an idle handover, in which MS in idle state with WiMAX service flow or HRPD IP flow switches between these two technologies. Another scenario is traffic handover in which MS switches between these two technologies while having data traffic.

One challenge presented when handing over from a first RAT to a second RAT is to ensure proper quality of service (QoS) parameters are maintained since the two technologies may have substantially different ways for specifying the QoS parameters.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

The Institute of Electrical and Electronics Engineers (IEEE) 802.16x is an emerging standard organization to define an air interface for fixed and mobile broadband wireless access (BWA) systems. IEEE 802.16x approved "IEEE P802.16d/D5-2004" in May 2004 for fixed BWA systems and published "IEEE P802.16e/D12 Oct. 2005" in October 2005 for mobile BWA systems. Those two standards defined four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
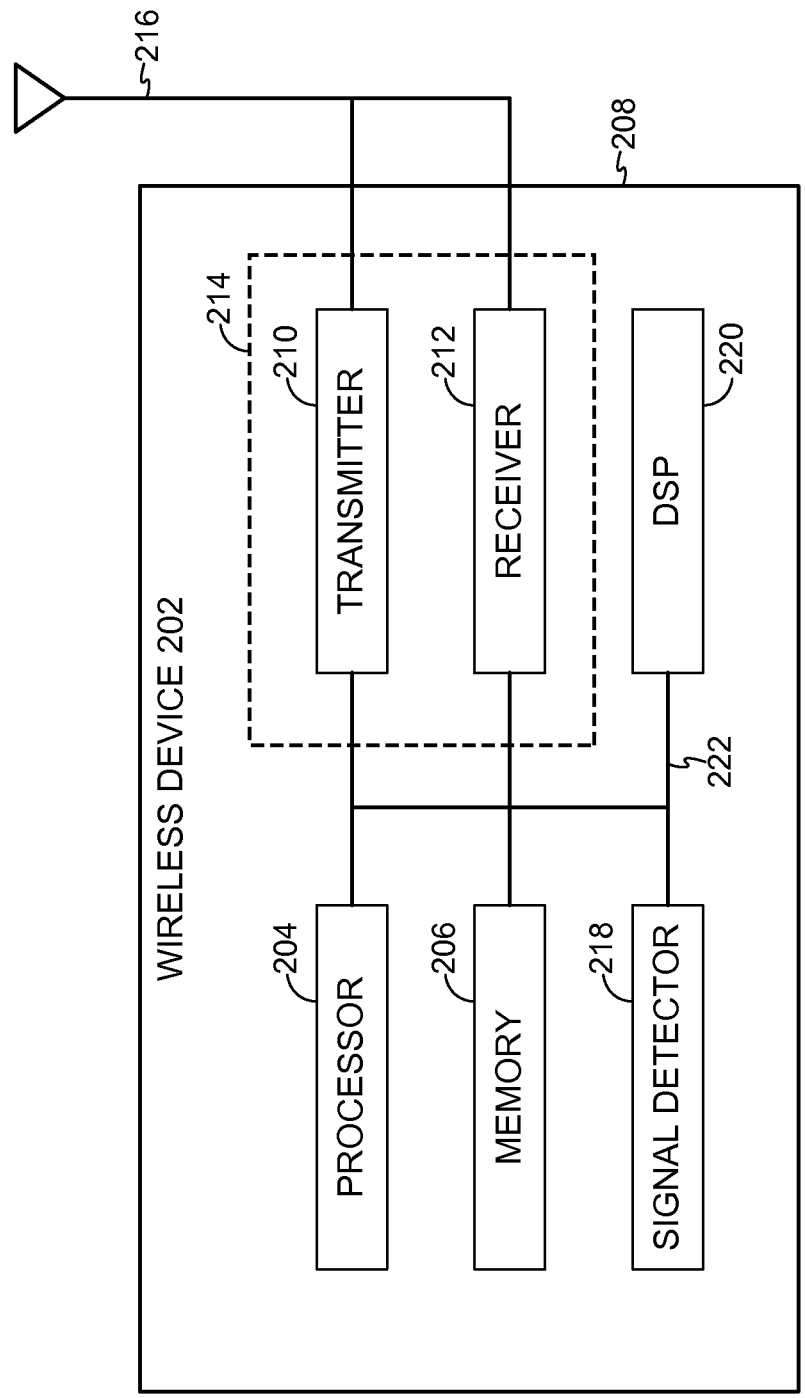
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
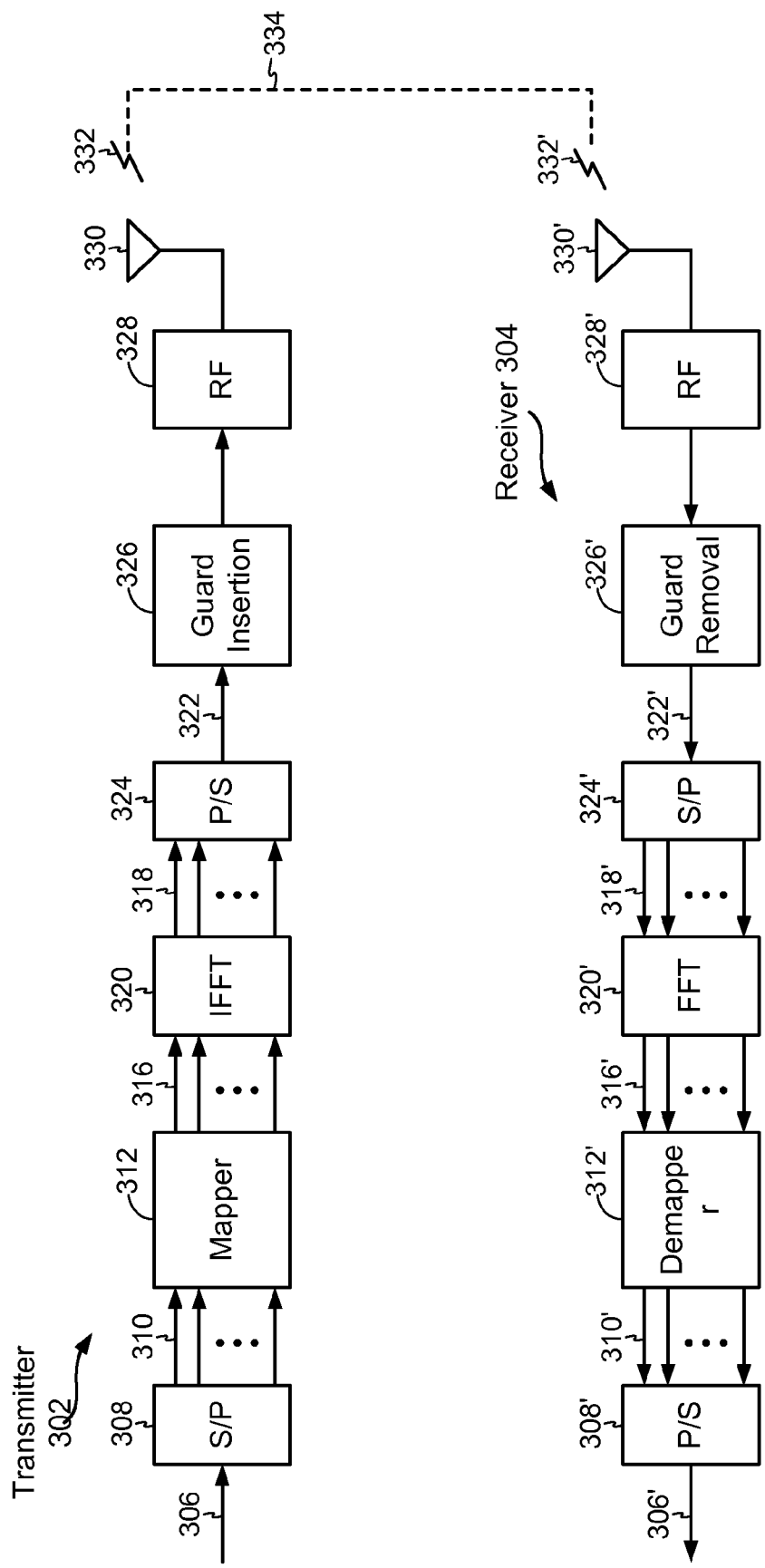
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$, (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary QOS Translation between WiMAX and HRPD Networks

A multi-mode mobile station (MS) may perform handover from a network serviced by a first Radio Access Technology (RAT) to a network serviced by a second RAT. For example, an MS may handover from a WiMAX network to a Code Division Multiple Access (CDMA) HRPD (High Rate Packet Data) network, and vice versa. As noted above, one scenario is an idle handover, in which an MS in an idle state with a WiMAX service flow or an HRPD Internet Protocol (IP) flow switches between the two RATs. Another scenario is a handover in which an MS switches between the two RATs while maintaining data traffic.

Certain embodiments of the present disclosure provide techniques for translating Quality of Service (QoS) parameters from one RAT to QoS parameters of another RAT. Such translation may help maintain traffic flow after the handover procedure, for example, by translating QoS parameters between a WiMAX service flow and a CDMA HRPD IP flow (or Radio Link Protocol (RLP) flow). The translations may be necessary since the two technologies may have substantially different ways for specifying the QoS parameters. The translation between the QoS parameters may be performed either at the mobile station, on the network-side (e.g., at the base station), or both.

Figure 4:
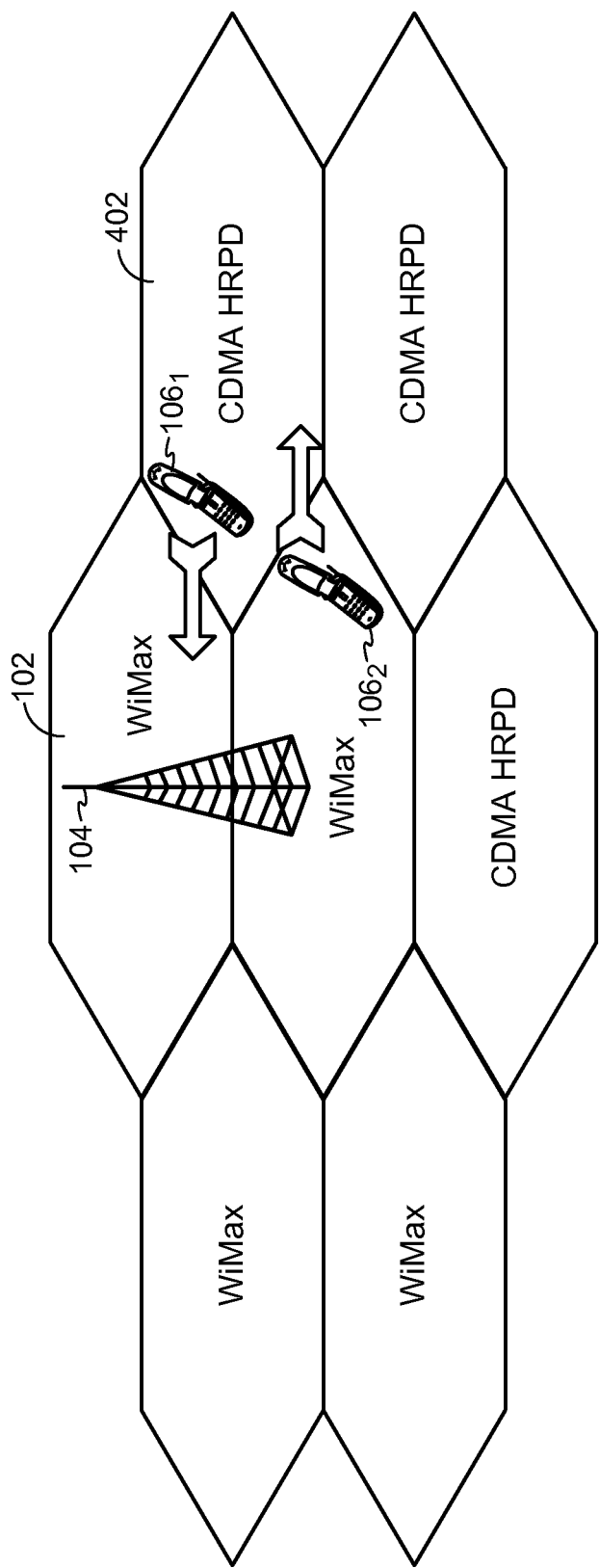
FIG. 4 illustrates example mobile stations switching between Worldwide Interoperability for Microwave Access (WiMAX) and code division multiple access (CDMA) HRPD (High Rate Packet Data) networks, in accordance with certain embodiments of the present disclosure.

FIG. 4 illustrates an example scenario with a mobile station switching from a WiMAX network to a CDMA HRPD network and a mobile station switching from a CDMA HRPD network to a WiMAX network. In the illustrated example, a first MS $106_1$ hands over from a CDMA HPRD network (cell 402) to a WiMAX network (cell 102), while a second MS $106_2$ hands over from the WiMAX network to the CDMA HPRD network. In this example, each MS should be able to translate the QoS parameters between the two technologies.

Figure 5:
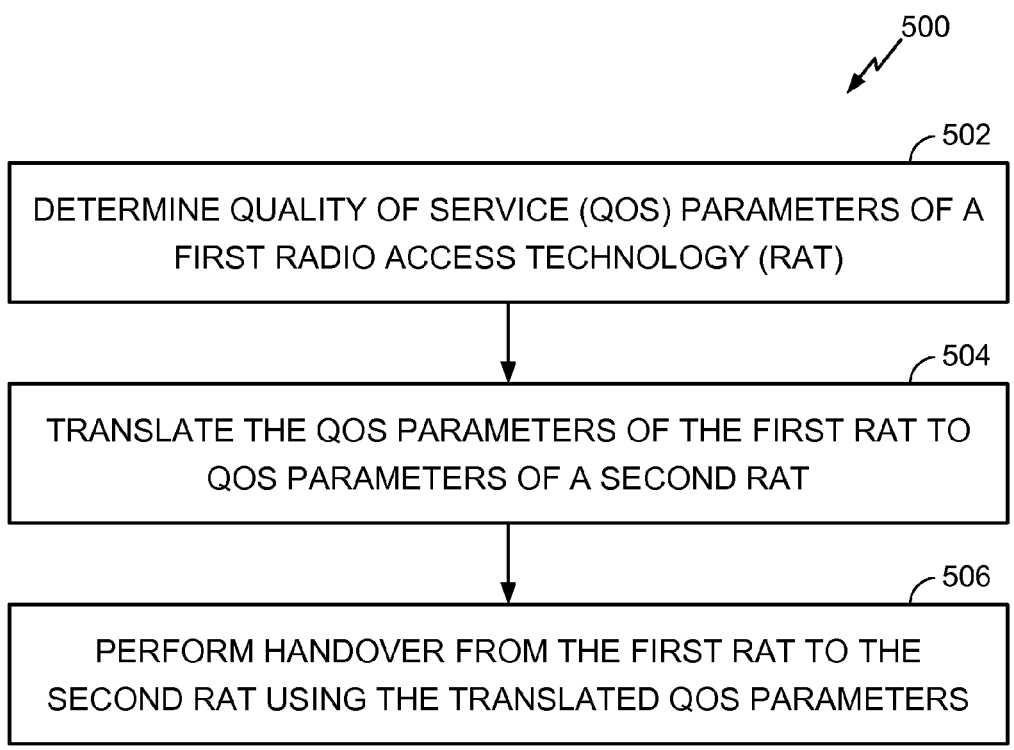
FIG. 5 illustrates example operations capable of translating quality of service (QoS) parameters in a first radio access technology (RAT) to a second RAT, in accordance with certain embodiments of the present disclosure.

FIG. 5 illustrates example operations capable of translating QoS parameters of a first radio access technology (RAT) to a second RAT, in accordance with certain embodiments of the present disclosure. At 502, QoS parameters of a first RAT are determined. For example, the first RAT may be WiMAX. At 504, the QoS parameters of the first RAT are translated to the QoS parameters of a second RAT. For example the second RAT may be CDMA HRPD. After translation, a handover between the two technologies may be performed at 506.

FIG. 6 illustrates a table with example QoS flow parameters in the WiMAX standard for different types of data delivery. Note that in this table, required parameters are marked with an X. As illustrated, each of the services, such as Unsolicited Grant Service (UGS), Extended real-time variable rate (ERT-VR) service, Real-time variable rate (RT-VR) service, Non-real-time variable rate (NRT-VR) service, and Best-effort (BE) service have different QoS requirements.

In CDMA HRPD technology, the QoS of the flow parameters are specified in the 3GPP2 standards (e.g., in QOS_ATTRIBUTE_SET). There may be two operational modes: verbose or non-verbose. For the verbose mode, the following parameters are required: traffic class (Traffic_Class, 3 bits), in which 0, 1, 2, 3 and 4 represent Unknown, Conversational, Streaming, Interactive and Background, respectively, and 5-7 are Reserved. Peak rate (Peak_Rate), token bucket size (Bucket_size), and token rate (Token_Rate) are represented by 16 bits, and are determined in units of 256 bytes per second. Maximum latency (Max_latency) may be represented by 8 bits in units of 10 ms. Maximum Internet Protocol packet loss rate (Max_IP_packet_loss_rate) may be represented by 5 bits in units of $10^{(-n/4)}$. Median packet size (Packet_size) may be represented by 8 bits, in which mean packet size may be shown in units of 8 bytes, and delay variation sensitivity indicator (Delay_Var_Sensitive) may be represented by one bit in which values of 1 and 0 show a delay sensitive system and a system that is not delay sensitive, respectively.

For the CDMA HRPD non-verbose mode, the 3GPP2 standards define a 16-bit FlowProfileID to abstract the QoS parameters whose details are presented in the tables in FIGS. 7-13.

Certain embodiments of the present disclosure provide techniques to translate the QoS parameters between WiMAX and CDMA HRPD networks that may facilitate handover of a multi-mode mobile station between the networks.

For certain embodiments of the present disclosure, the translation of QoS parameters from WiMAX to CDMA HRPD in verbose mode may be accomplished according to the following equations:

$$\text{Traffic\_Class} = \begin{cases} \text{Conversational} & \text{if Type of Data Delivery} = ERT\text{-}VR, \\ \text{Steaming} & \text{if Type of Data Delivery} = RT\text{-}VR, \\ \text{Interactive} & \text{if Type of Data Delivery} = NRT\text{-}VR, \\ \text{Background} & \text{if Type of Data Delivery} = BE. \end{cases}$$

$$\text{Peak\_Data\_Rate} = \begin{cases} \text{Floor}(MaximumSustainedTrafficRate/2048) & \text{if } MaximumSustainedTrafficRate \text{ is known,} \\ 0 & \text{if } MaximumSustainedTrafficRate \text{ is not known.} \end{cases}$$

$$\text{Max\_Latency} = \begin{cases} \text{Floor}(\text{Maximum Latency}/10) & \text{if Maximum Latency is known,} \\ 0 & \text{if Maximum Latency is not known.} \end{cases}$$

$$\text{Max\_IP\_Packet\_Loss\_Rate} = \begin{cases} -4 * \log(\text{Packet Error Rate} * a) & \text{if Packet Error Rate is known,} \\ 0, & \text{if Packet Error Rate is unknown.} \end{cases}$$

In the above equation, the parameter a is a design factor. If Packet Error Rate is measured after automatic repeat request (ARQ) and hybrid ARQ (HARQ) (i.e., bit 7 of Packet Error Rate is 0), a may be set to 1. If Packet Error Rate is measured before ARQ and HARQ (i.e., bit 7 of Packet Error Rate is 1), a may be set to a value smaller than 1 (e.g., 0.1).

For certain embodiments, the Paket_size, Delay_var_sensitive and Token_rate for the CDMA HRPD may be chosen according to the following equations:

$$\text{Packet\_Size} = \begin{cases} SDU \text{ Size} * 8 & \text{if } SDU \text{ Size is known,} \\ 0 & \text{if } SDU \text{ Size is unknown.} \end{cases}$$

$$\text{Delay\_Var\_Sensitive} = \begin{cases} 1 & \text{for } UGS, \\ 0 & \text{for } ERT\text{-}VR, RT\text{-}VR, NRT\text{-}VR \text{ and } BE \end{cases}$$

$$\text{Token\_Rate} = U * 2048,$$

where service data unit (SDU) size represents the size of an SDU packet, U is a design factor which has a value between a Maximum Sustained Traffic Rate and a Minimum Reserved Traffic Rate.

A Bucket_Size parameter may be calculated according to the following equation:

$$\text{Bucket\_Size} * 2048/t + \text{Token\_Rate} * 2048 = \text{Maximum Sustained Traffic Rate}$$

where t is equal to the value of a Maximum Traffic Burst divided by the value of a Maximum Sustained Traffic Rate.

For certain embodiments of the present disclosure, the translation of QoS parameters from WiMAX to CDMA HRPD in non-verbose mode may be defined as described below. For certain embodiments, the UGS, ERT-VR, and RT-VR types of data delivery may be mapped to generic data service with FlowProfileID=5-20 using the following parameters:

$$\text{Minimum Acceptable User Data Rate} = f1(\text{Minimum Reserved Traffic Rate}),$$

where $$f1(x) = \begin{cases} 32 \text{ kbps}, & \text{if } 64 \text{ kbps} > x > 0, \\ 64 \text{ kbps}, & \text{if } 96 \text{ kbps} > x \geq 64 \text{ kbps}, \\ 96 \text{ kbps}, & \text{if } 144 \text{ kbps} > x \geq 96 \text{ kbps}, \\ 144 \text{ kbps}, & \text{if } 384 \text{ kbps} > x \geq 144 \text{ kbps}, \\ 384 \text{ kbps}, & \text{if } 768 \text{ kbps} > x \geq 384 \text{ kbps}, \\ 768 \text{ kbps}, & \text{if } 1536 \text{ kbps} > x \geq 768 \text{ kbps}, \\ 1536 \text{ kbps}, & \text{if } 768 \text{ kbps} > x \geq 1536 \text{ kbps}. \end{cases}$$

$$\text{Max\_Latency} = 100 \text{ ms}$$

$$\text{Average Data Loss Rate} = \begin{cases} f2(\text{Packet Error Rate}) & \text{if specified,} \\ 1\% & \text{if unspecified} \end{cases}$$

where $$f2(x) = \begin{cases} 1\%, & \text{if } x \geq b1 \\ 0.1\%, & \text{if } b1 > x \geq b2 \\ 0.0001\%, & \text{if } b2 > x \end{cases}$$

where the parameters b1 and b2 are design parameters.

For certain embodiments, the NT-VR type of data delivery may be mapped to generic data service with FlowProfileID=40~60 using the following parameters:

$$\text{Minimum Acceptable User Data Rate} = f1(\text{Minimum Reserved Traffic Rate}),$$

Max_Latency=2000 ms, $$\text{Average Data Loss Rate} = \begin{cases} f2(\text{Packet Error Rate}) & \text{if specified,} \\ 1\% & \text{if unspecified} \end{cases}$$

For certain embodiments, the BE type of data delivery may be mapped to the FlowProfileID=0 (best effort).

For certain embodiments of the present disclosure, in order to translate the QoS parameters from the verbose mode of CDMA HRPD to WiMAX, the following parameters may be used:

$$\text{Type of Data Delivery} = \begin{cases} \text{ERT-VR} & \text{if Traffic\_class} = \text{Conversational,} \\ \text{RT-VR} & \text{if Traffic\_class} = \text{Streaming,} \\ \text{NRT-VR} & \text{if Traffic\_class} = \text{Interactive,} \\ \text{BE} & \text{if Traffic\_class} = \text{Background} \end{cases}$$

For the Conversational, Streaming, Interactive, and Background modes, the Maximum Sustained Traffic Rate may be defined as follows:

Maximum Sustained Traffic Rate=Peak_Data_Rate*2048,

For the Conversational, Streaming, and Interactive modes, the Minimum Reserved Traffic Rate may be defined as follows:

Minimum Reserved Traffic Rate=min{Token_Rate*2048, Peak_Data_Rate*$b$}, where $b \geq 1$ is a design factor.

For the Conversational and Streaming modes, Maximum Latency may be defined as follows:

Maximum Latency=Max_Latency*10,

Packet Error Rate may be defined as follows, it may also be measured after ARQ and HARQ if Max_IP_Packet_Loss_Rate is known.

Packet Error Rate=$10^{-(Max\_IP\_Packet\_Loss\_Rate/4)}$

Maximum Traffic Burst may be calculated by the following equations:

Token_Rate*2048+Bucket_Size*2048/$t$=Maximum Sustained Traffic Rate

Maximum Traffic Burst/Maximum Sustained Traffic Rate=$t$

For certain embodiments of the present disclosure, the QoS parameters may be translated from non-verbose mode of CDMA HRPD to WiMAX as follows.

FIGS. 7A-7F illustrate an example translation of the QoS parameters of the CDMA HRPD generic data service to the QoS parameters of the WiMAX standard, in accordance with certain embodiments of the present disclosure. The rules for translating the QoS from non-verbose mode of CDMA HRPD generic data service to WiMAX may be implemented as described below. Streaming may be translated to the RT-VR type of data delivery. Max latency=100 ms may be translated to the type RT-VR of data delivery. Otherwise, the remaining Profile IDs may be mapped to the type NRT-VR of data delivery unless the Profile ID is equal to zero (i.e., best effort), which may be mapped to the best effort type of data delivery.

Minimum Reserved Traffic Rate (mRTR) in WiMAX may be equal to what is specified in the CDMA HRPD. Maximum Sustained Traffic Rate (MSTR) may be calculated by multiplying mRTR by a design factor $c1$. For the BE type of data delivery, MSTR may utilize a design factor $R1$. Maximum Latency for the RT-VR may be 100 ms, but for Streaming data, ML may be translated to a design factor L. Packet Error Rate (PER) may be kept as specified in CDMA HRPD and is measured after ARQ and HARQ. Polling Interval may be calculated by multiplying Maximum Latency by a design factor $c2$.

FIGS. 8A-8D illustrate an example translation of the QoS parameters of the CDMA HRPD speech service to the QoS parameters of the WiMAX, in accordance with certain embodiments of the present disclosure. The following rules may be used to translate the QoS from non-verbose mode of CDMA HRPD to WiMAX speech service. Conversational, full rate, no frame bundling may be translated to UGS. Conversational, with maximum number of N frames bundling may be translated to the type ERT-VR of data delivery, and streaming may be translated to the type RT-VR of data delivery. Minimum Reserved Traffic Rate for the first rate set may be translated to 9.6 kbps, for the second rate set may be translated to 14.4 kbps, and for the half of the first rate set may be translated to 9.6 kbps×½, unless it is specified differently.

Maximum Sustained Traffic Rate may be calculated by multiplying mRTR by the maximum number of frames that are bundled (N). For a case without frame bundling and full rate, MSTR may be translated to mRTR. Maximum Latency may be translated to a design factor $L1$ for conversational and $L2$ for streaming Packet Error Rate may be translated to a design factor $E1$ which may be measured after ARQ and HARQ. Poling Interval may be calculated by multiplying Maximum Latency by a design factor $c2$. Unsolicited Grant Interval for UGS may be equal to 20 ms.

FIG. 9 illustrates an example translation of the QoS parameters of the CDMA HRPD audio service for different profile IDs to the QoS parameters of the WiMAX, in accordance with certain embodiments of the present disclosure. For certain embodiments of the present disclosure, the following rules may be used to translate the QoS from the non-verbose mode of CDMA HRPD audio service to WiMAX. Streaming may be translated to the type RT-VR of data delivery. Minimum Reserved Traffic Rate may be similar to what is specified in HRPD.

Maximum Sustained Traffic Rate may be translated to mRTR multiplied by a design factor $c3$. Maximum Latency may be equal to a design factor $L3$. Packet Error Rate may be translated to a design factor $E2$ which may be measured after ARQ and HARQ. Polling Interval may be translated to the Maximum Latency multiplied by a design factor $c2$.

FIG. 10 illustrates an example translation of the QoS parameters of the CDMA HRPD video service for different profile IDs to the QoS parameters of the WiMAX standard, in accordance with certain embodiments of the present disclosure. For certain embodiments of the present disclosure, the following rules may be used to translate the QoS from the non-verbose mode of CDMA HRPD video service to WiMAX. Conversational may be translated to the type ERT-VR of data delivery, and streaming may be translated to the type RT-VR of data delivery.

Minimum Reserved Traffic Rate may be similar to what is specified in HRPD. Maximum Sustained Traffic Rate may be equal to mRTR multiplied by a design factor $c4$. Maximum Latency may be equal to a design factor $L4$ for conversational and $L5$ for streaming Packet Error Rate (PER) may be a design factor E3 which is measured after ARQ and HARQ. Polling Interval may be equal to the Maximum Latency multiplied by a design factor c2.

FIG. 11 illustrates an example translation of the QoS parameters of the CDMA HRPD text service to the QoS parameters of the WiMAX standard, in accordance with certain embodiments of the present disclosure. The following rules may be used for translating the QoS from non-verbose mode of CDMA HRPD to WiMAX text service. Streaming may be translated to the type RT-VR of data delivery. Minimum Reserved Traffic Rate (mRTR) may be equal to a design factor R3.

The Maximum Sustained Traffic Rate may be translated to mRTR multiplied by a design factor c5. Maximum Latency may be equal to a design factor L8. Packet Error Rate may be equal to a design factor E4, which may be measured after ARQ and HARQ. Polling Interval may be equal to Maximum Latency multiplied by a design factor c2.

FIG. 12 illustrates an example translation of the QoS parameters of the CDMA HRPD signaling service to the QoS parameters of the WiMAX standard, in accordance with certain embodiments of the present disclosure. The following rules may be used to translate the QoS from the non-verbose mode of CDMA HRPD signaling service to WiMAX. All the signaling modes may be translated to the type ERT-VR of data delivery because it may allow contention-based bandwidth requests.

Minimum Reserved Traffic Rate may be equal to a design factor R2. Maximum Sustained Traffic Rate may be equal to mRTR multiplied by a design factor c6. Maximum Latency may be equal to a design factor L6. Packet Error Rate may be equal to a design factor E5 which may be measured after ARQ and HARQ. Polling Interval may be equal to the Maximum Latency multiplied by a design factor c2.

FIG. 13 illustrates an example translation of the QoS parameters of the CDMA HRPD gaming service to the QoS parameters of the WiMAX standard, in accordance with certain embodiments of the present disclosure. The following rules may be used to translate the QoS from non-verbose mode of CDMA HRPD gaming service to WiMAX. Type of the data delivery may be equal to the ERT-VR because it may allow contention-based bandwidth requests.

Minimum Reserved Traffic Rate may be equal to a design factor R3. Maximum Sustained Traffic Rate may be calculated by multiplying the mRTR by a design factor c7. Maximum Latency may be equal to a design factor L7. Packet Error Rate may be equal to a design factor E6 which may be measured after the ARQ and HARQ. Polling Interval may be equal to the Maximum Latency multiplied by a design factor c2.

As described above, certain embodiments of the present disclosure allow a multi-mode MS to translate the QoS parameters to facilitate inter-RAT handover. The proposed method may improve the QoS continuity when MS hands over from the WiMAX network to the CDMA HRPD network, and vice versa. The proposed translation method also introduces some design factors that need to be considered at MS or configured in the network.

Figure 5A:
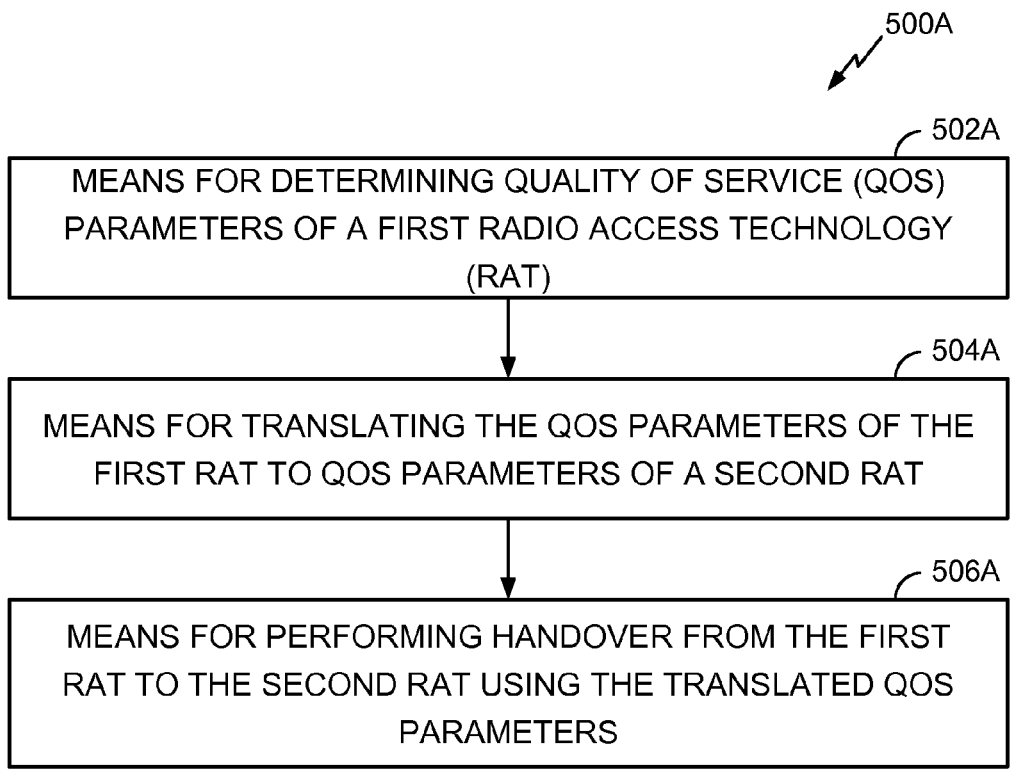
FIG. 5A illustrates example components capable of performing the operations illustrated in FIG. 5.

The various operations of methods described above may be performed by various hardware and/or software component(s) and/or module(s) corresponding to means-plus-function blocks illustrated in the figures. Generally, where there are methods illustrated in figures having corresponding counterpart means-plus-function figures, the operation blocks correspond to means-plus-function blocks with similar numbering. For example, operations 500 illustrated in FIG. 5 corresponds to means-plus-function blocks 500A illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications, comprising:
   determining quality of service (QoS) parameters of a first radio access technology (RAT);
   translating the QoS parameters of the first RAT to QoS parameters of a second RAT, wherein the translating includes applying an equation to a first value of one of the QoS parameters of the first RAT to obtain a second value of one of the QoS parameters of the second RAT, wherein the equation is selected based on type of data delivery and mode of operation of the first or second RAT, the type of data delivery comprising at least one of an unsolicited grant, a best effort, a real-time variable rate, or a combination thereof and the mode of operation comprising a verbose mode or a non-verbose mode, wherein the second value is different from the first value; and
   performing a handover using the translated QoS parameters of the second RAT, the handover being from a first network utilizing the first RAT to a second network utilizing the second RAT.

2. The method of claim 1, wherein at least one of the first and the second RATs comprises a RAT in accordance with one or more standards of the Institute of Electrical and Electronics Engineers (IEEE) 802.16 family of standards.

3. The method of claim 2, wherein the QoS parameters of the 802.16 family RAT comprise at least one parameter selected from a group consisting of: type of data delivery, maximum sustained traffic rate, minimum reserved traffic rate, maximum latency, packet error rate and maximum traffic burst.

4. The method of claim 1, wherein at least one of the first and the second RATs comprises a code division multiple access (CDMA) high rate packet data (HRPD) RAT.

5. The method of claim 4, wherein the QoS parameters of the CDMA HRPD RAT comprise parameters related to CDMA HRPD in verbose mode comprising at least one item selected from a group consisting of: traffic class, peak rate, token bucket size, token rate, maximum latency, maximum Internet Protocol packet loss rate, median packet size, and delay variation sensitivity indicator.

6. The method of claim 1, wherein:
   one of the first and the second RATs comprises a RAT in accordance with one or more standards of the Institute of Electrical and Electronics Engineers (IEEE) 802.16 family of standards,
   the QoS parameters of the one RAT comprise at least one parameter selected from a group consisting of: type of data delivery, maximum sustained traffic rate, minimum reserved traffic rate, maximum latency, packet error rate and maximum traffic burst,
   the other of the first and the second RATs comprises a code division multiple access (CDMA) high rate packet data (HRPD) RAT, and
   the QoS parameters of the other RAT comprise parameters related to CDMA HRPD in verbose mode comprising at least one parameter selected from a group consisting of: traffic class, peak rate, token bucket size, token rate, maximum latency, maximum Internet Protocol packet loss rate, median packet size, and delay variation sensitivity indicator.

7. An apparatus for wireless communications, comprising:
   means for determining quality of service (QoS) parameters of a first radio access technology (RAT);
   means for translating the QoS parameters of the first RAT to QoS parameters of a second RAT, wherein the translating includes applying an equation to a first value of one of the QoS parameters of the first RAT to obtain a second value of one of the QoS parameters of the second RAT, wherein the equation is selected based on type of data delivery and mode of operation of the first or second RAT, the type of data delivery comprising at least one of an unsolicited grant, a best effort, a real-time variable rate, or a combination thereof and the mode of operation comprising a verbose mode or a non-verbose mode, wherein the second value is different from the first value; and
   means for performing a handover using the translated QoS parameters of the second RAT, the handover being from a first network utilizing the first RAT to a second network utilizing the second RAT.

8. The apparatus of claim 7, wherein at least one of the first and the second RATs comprises a RAT in accordance with one or more standards of the Institute of Electrical and Electronics Engineers (IEEE) 802.16 family of standards.

9. The apparatus of claim 8, wherein the QoS parameters of the 802.16 family RAT comprise at least one parameter selected from a group consisting of: type of data delivery, maximum sustained traffic rate, minimum reserved traffic rate, maximum latency, packet error rate and maximum traffic burst.

10. The apparatus of claim 7, wherein at least one of the first and the second RATs comprises a code division multiple access (CDMA) high rate packet data (HRPD) RAT.

11. The apparatus of claim 10, wherein the QoS parameters of the CDMA HRPD RAT comprise parameters related to CDMA HRPD in verbose mode comprising at least one parameter selected from a group consisting of: traffic class, peak rate, token bucket size, token rate, maximum latency, maximum Internet Protocol packet loss rate, median packet size, and delay variation sensitivity indicator.

12. The apparatus of claim 7, wherein:
one of the first and the second RATs comprises a RAT in accordance with one or more standards of the Institute of Electrical and Electronics Engineers (IEEE) 802.16 family of standards,
the QoS parameters of the one RAT comprise at least one parameter selected from a group consisting of: type of data delivery, maximum sustained traffic rate, minimum reserved traffic rate, maximum latency, packet error rate and maximum traffic burst,
the other of the first and the second RATs comprises a code division multiple access (CDMA) high rate packet data (HRPD) RAT, and
the QoS parameters of the other RAT comprise parameters related to CDMA HRPD in verbose mode comprising at least one parameter selected from a group consisting of: traffic class, peak rate, token bucket size, token rate, maximum latency, maximum Internet Protocol packet loss rate, median packet size, and delay variation sensitivity indicator.

13. An apparatus for wireless communications, comprising:
a processor;
memory in electronic communication with the processor;
instructions stored in the memory, the instructions being executable by the processor to:
determine quality of service (QoS) parameters of a first radio access technology (RAT);
translate the QoS parameters of the first RAT to QoS parameters of a second RAT, wherein the instructions executable by the processor to translate the QoS parameters include instructions executable by the processor to apply an equation to a first value of one of the QoS parameters of the first RAT to obtain a second value of one of the QoS parameters of the second RAT, wherein the equation is selected based on type of data delivery and mode of operation of the first or second RAT, the type of data delivery comprising at least one of an unsolicited grant, a best effort, a real-time variable rate, or a combination thereof and the mode of operation comprising a verbose mode or a non-verbose mode, wherein the second value is different from the first value; and
perform a handover using the translated QoS parameters of the second RAT, the handover being from a first network utilizing the first RAT to a second network utilizing the second RAT.

14. The apparatus of claim 13, wherein at least one of the first and the second RATs comprises a RAT in accordance with one or more standards of the Institute of Electrical and Electronics Engineers (IEEE) 802.16 family of standards.

15. The apparatus of claim 14, wherein the QoS parameters of the 802.16 family RAT comprise at least one parameter selected from a group consisting of: type of data delivery, maximum sustained traffic rate, minimum reserved traffic rate, maximum latency, packet error rate and maximum traffic burst.

16. The apparatus of claim 13, wherein at least one of the first and the second RATs comprises a code division multiple access (CDMA) high rate packet data (HRPD) RAT.

17. The apparatus of claim 16, wherein the QoS parameters of the CDMA HRPD RAT comprise parameters related to CDMA HRPD in verbose mode comprising at least one parameter selected from a group consisting of: traffic class, peak rate, token bucket size, token rate, maximum latency, maximum Internet Protocol packet loss rate, median packet size, and delay variation sensitivity indicator.

18. The apparatus of claim 13, wherein:
one of the first and the second RATs comprises a RAT in accordance with one or more standards of the Institute of Electrical and Electronics Engineers (IEEE) 802.16 family of standards,
the QoS parameters of the one RAT comprise at least one parameter selected from a group consisting of: of data delivery, maximum sustained traffic rate, minimum reserved traffic rate, maximum latency, packet error rate and maximum traffic burst,
the other of the first and the second RATs comprises a code division multiple access (CDMA) high rate packet data (HRPD) RAT, and
the QoS parameters of the other RAT comprise parameters related to CDMA HRPD in verbose mode comprising at least one parameter selected from a group consisting of: traffic class, peak rate, token bucket size, token rate, maximum latency, maximum Internet Protocol packet loss rate, median packet size, and delay variation sensitivity indicator.

19. A computer-program product for wireless communications, comprising a non-transitory computer readable medium having instructions stored thereon, the instructions being executable by one or more processors and the instructions comprising:
instructions for determining quality of service (QoS) parameters of a first radio access technology (RAT);
instructions for translating the QoS parameters of the first RAT to QoS parameters of a second RAT, wherein the instructions for translating the QoS parameters include instructions for applying an equation to a first value of one of the QoS parameters of the first RAT to obtain a second value of one of the QoS parameters of the second RAT, wherein the equation is selected based on data delivery type and mode of operation of the first or second RAT, the type of data delivery comprising at least one of an unsolicited grant, a best effort, a real-time variable rate, or a combination thereof and the mode of operation comprising a verbose mode or a non-verbose mode, wherein the second value is different from the first value; and
instructions for performing a handover using the translated QoS parameters of the second RAT, the handover being from a first network utilizing the first RAT to a second network utilizing the second RAT.

20. The computer-program product of claim 19, wherein at least one of the first and the second RATs comprises a RAT in accordance with one or more standards of the Institute of Electrical and Electronics Engineers (IEEE) 802.16 family of standards.

21. The computer-program product of claim 20, wherein the QoS parameters of the 802.16 family RAT comprise at least one parameter selected from a group consisting of: type of data delivery, maximum sustained traffic rate, minimum reserved traffic rate, maximum latency, packet error rate and maximum traffic burst.

22. The computer-program product of claim 19, wherein at least one of the first and the second RATs comprises a code division multiple access (CDMA) high rate packet data (HRPD) RAT.

23. The computer-program product of claim 22, wherein the QoS parameters of the CDMA HRPD RAT comprise parameters related to CDMA HRPD in verbose mode comprising at least one parameter selected from a group consisting of: the traffic class, peak rate, token bucket size, token rate, maximum latency, maximum Internet Protocol packet loss rate, median packet size, and delay variation sensitivity indicator.

24. The computer-program product of claim 19, wherein:
one of the first and the second RATs comprises a RAT in accordance with one or more standards of the Institute of Electrical and Electronics Engineers (IEEE) 802.16 family of standards,
the QoS parameters of the one RAT comprise at least one parameter selected from a group consisting of: type of data delivery, maximum sustained traffic rate, minimum reserved traffic rate, maximum latency, packet error rate and maximum traffic burst,
the other of the first and the second RATs comprises a code division multiple access (CDMA) high rate packet data (HRPD) RAT, and
the QoS parameters of the other RAT comprise parameters related to CDMA HRPD in verbose mode comprising at least one parameter selected from a group consisting of: the traffic class, peak rate, token bucket size, token rate, maximum latency, maximum Internet Protocol packet loss rate, median packet size, and delay variation sensitivity indicator.

* * * * *